(12) United States Patent
Konno et al.

(10) Patent No.: US 7,498,928 B2
(45) Date of Patent: Mar. 3, 2009

(54) ELECTRONIC KEY SYSTEM FOR VEHICLE, AND VEHICLE

(75) Inventors: Takeshi Konno, Wako (JP); Takao Yamamoto, Wako (JP); Tomohiko Yashiro, Wako (JP); Masaki Yamazaki, Wako (JP); Sho Yamamoto, Wako (JP); Yusuke Funayose, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 374 days.

(21) Appl. No.: 11/358,579

(22) Filed: Feb. 21, 2006

(65) Prior Publication Data

US 2006/0187007 A1 Aug. 24, 2006

(30) Foreign Application Priority Data

Feb. 24, 2005 (JP) ............................. 2005-049091

(51) Int. Cl.
  *B60R 25/10* (2006.01)
  *G05B 19/00* (2006.01)
(52) U.S. Cl. ............................. 340/426.15; 340/426.18; 340/5.61
(58) Field of Classification Search ............. 340/426.35
  See application file for complete search history.

(56) References Cited

U.S. PATENT DOCUMENTS

| 4,910,493 | A | * | 3/1990 | Chambers et al. ...... 340/426.14 |
| 5,723,911 | A | * | 3/1998 | Glehr ........................ 340/10.5 |
| 5,838,227 | A | * | 11/1998 | Murray ................... 340/539.21 |
| 6,181,997 | B1 | * | 1/2001 | Badenoch et al. ............. 701/37 |
| 6,861,947 | B2 | * | 3/2005 | Albert .................... 340/426.11 |
| 2004/0043802 | A1 | * | 3/2004 | Nagano ................... 455/575.9 |
| 2004/0046639 | A1 | * | 3/2004 | Giehler et al. ............. 340/5.63 |
| 2004/0193340 | A1 | * | 9/2004 | Katou ......................... 701/29 |
| 2005/0242929 | A1 | * | 11/2005 | Onishi et al. ........... 340/426.17 |

\* cited by examiner

*Primary Examiner*—Jeff Hofsass
*Assistant Examiner*—John F Mortell
(74) *Attorney, Agent, or Firm*—Hamre, Schumann, Mueller & Larson, P.C.

(57) ABSTRACT

An electronic key system for a vehicle provides a warning corresponding to a traveling state if an occupant has dropped the electronic key while a vehicle is running. A control unit 14 of the vehicle outputs a request signal Sr to the electronic key 12 at transmission intervals T corresponding to the traveling state. An answer signal Sa caused by the request signal Sr from the electronic key 12 is detected. A warning lamp 68 is lit up at a point after the detection of the answer signal Sa stops. The transmission interval T of the request signal Sr is specified in a map 88 stored in the control unit 14, and is set short corresponding to the increase of the vehicle speed V, the acceleration/deceleration 'a', and the yaw rate Y.

6 Claims, 10 Drawing Sheets

ELECTRONIC KEY SYSTEM FOR VEHICLE, AND VEHICLE

FIELD OF THE INVENTION

The technical disclosure herein relates to an electronic key system for a vehicle and a vehicle, which carry out wireless communication between a transmission/reception device (an electronic key) which an occupant carries and a control unit mounted on the vehicle, and, for example, when an ID comparison result as a consequence of the wireless communication shows that a request is from an authorized occupant, the engine is started.

BACKGROUND OF THE INVENTION

In an electronic key system for a vehicle, activation means are installed in a door handle and a trunk lid of a vehicle. When an occupant handles (activates) these activation means, communication with an electronic key is started, an ID transmitted from the electronic key and an ID registered in a control unit are compared, and, when the comparison result showing the coincidence between the IDs is obtained, a door lock and the like are released.

In addition, an activation means is installed in an ignition knob of the vehicle; and, when the occupant handles the ignition knob after the occupant gets in a four-wheeled car, the communication with the electronic key is again performed, and the ID comparison for permitting the engine to be started is performed. When the comparison result showing the coincidence between the IDs is obtained, the engine is started.

In other words, in the electronic key system for a vehicle, the electronic key functions to release the door lock and permits the engine to be started.

When the above electronic key system for a vehicle is applied to a motorcycle, there is a possibility that the engine cannot be re-started if the driver allows the motorcycle to start moving subsequent to inadvertent loss of the electronic key following start-up of the engine, although there is no problem if the occupant becomes timely aware of the fact.

Further, in the system applied to a motorcycle, the main purpose is prevention of theft; and the security system is designed to be stopped after the authorized occupant completes the authentication and rides on the motorcycle. Accordingly, there is a possibility that, if the electronic key has been dropped while the vehicle is running, for example, this fact cannot be detected.

In the prior art, the transmission interval of the request signal transmitted from the control unit while the vehicle is running is constant, and the appropriate transmission timing cannot always be realized, depending on the traveling state. For example, if the electronic key is dropped while the vehicle is traveling fast, the warning is outputted after the vehicle has traveled a substantial distance. In this case, the occupant has to return a substantial distance back to the point where the electronic key has been dropped, and there is apprehension that the time and labor required to search for the key will be substantial.

If the request signal is transmitted at short intervals constantly regardless of the traveling state, such apprehension can be eliminated. However, the result is that the electronic key transmits the answer signal correspondingly frequently, the power consumption of the battery increases, and the necessity to change the battery in a short time arises.

SUMMARY OF THE INVENTION

An electronic key system for a vehicle which overcomes the foregoing problems is described in Japanese Patent Publication No. 2004-114860, issued to the present inventors. This electronic key system for a vehicle outputs a warning when a corresponding answer signal is not detected in response to a request signal outputted from the control unit. Accordingly, in the case where the occupant has dropped the electronic key while the vehicle is stopped or the vehicle is running, it is possible to output the fact as a warning, which are preferable features. It is therefore possible to minimize the probability of the loss of the electronic key resulting from the occupant's having dropped the electronic key.

The electronic key system for a vehicle and a vehicle appropriately provide a warning corresponding to the traveling state if the occupant has dropped the electronic key while the vehicle is running, and which are capable of further reducing the probability of the loss of the electronic key resulting from the occupant's having dropped the electronic key and of reducing the labor required to search for the key.

An electronic key system for a vehicle according to one embodiment comprises a control unit mounted on the vehicle, and a portable transmission/reception device for transmitting an answer signal in accordance with reception of a request signal from the control unit. The control unit comprises: first means for outputting the request signal to the portable transmission/reception device at transmission intervals corresponding to a traveling state of the vehicle; second means for detecting the answer signal caused by the request signal from the portable transmission/reception device; and third means for outputting a warning at a point after the detection of the answer signal in the second means stops.

The request signal is outputted at constant intervals via the first means. When an occupant carries the portable transmission/reception device, the answer signal is outputted at constant intervals in response to the request signal from the control unit. The answer signal outputted from the portable transmission/reception device is detected by the second means in the control unit of the vehicle; and a warning is not outputted in this case.

On the other hand, if the occupant has dropped the portable transmission/reception device while the vehicle is running, the answer signal is no longer detected by the second means, a warning is outputted via the third means in this case, and the occupant then becomes aware that the portable transmission/reception device has been dropped. In addition, since the first means outputs the request signal at transmission intervals corresponding to the traveling state of the vehicle, an appropriate warning corresponding to the traveling state is outputted; and it is possible to further reduce the probability of the loss of the portable transmission/reception device resulting from the occupant's having dropped the electronic key and to reduce the labor required to search for the key. Moreover, excessive transmission of the answer signal can be avoided, and the power consumption of the battery can be suppressed.

In this case, the traveling state may be vehicle speed; and the first means may shorten the transmission interval of the request signal correspondingly to the increase of the vehicle speed. Accordingly, the distance traveled from the point when the occupant has dropped the portable transmission/reception device to the point when the warning is outputted does not become excessively long. Therefore, it is easy to return to the point where the portable transmission/reception device has been dropped; and the time and labor required to search for the device is reduced.

In this case, it is preferable that the vehicle speed and the transmission interval of the request signal be set inversely proportional to one another. The travel distance represented by the vehicle speed and the transmission interval then becomes substantially steady, and the area to search is limited. The area is defined as being from the point where the warning is outputted to the point where the portable transmission/reception device has been dropped.

Alternatively, the traveling state may be an acceleration/deceleration; and the first means may shorten the transmission interval of the request signal corresponding to the increase of the acceleration/deceleration. The traveling state may be a yaw rate; and the first means may shorten the transmission interval of the request signal corresponding to the increase of the yaw rate.

When, for example, the acceleration/deceleration becomes large at the time when the vehicle starts to move, or when the yaw rate becomes large at the time of cornering or the like, the probability increases that the portable transmission/reception device will be dropped. Shortening the transmission interval of the request signal corresponding to the increase of the acceleration/deceleration or the yaw rate, correspondingly shortens the transmission interval of the warning; and, in such cases, the probability that the portable transmission/reception device is lost further decreases.

The control unit may have a map representing the relationship between the transmission interval of the request signal and the traveling state; and the first means may search the map on the basis of the traveling state, and set the transmission interval of the request signal. By searching the map, the transmission interval of the request signal corresponding to the traveling state can be quickly and easily set.

It is preferable that the control unit and the portable transmission/reception device perform the transmission/reception of the answer signal and the request signal via a radio wave. Radio waves have a high penetrability characteristic, with which it is possible to transmit/receive signals without unduly being influenced by an obstacle such as clothing. The transmission/reception thereof is easy, even in the case of a considerably complex signal. The circuits for the transmission/reception can also be inexpensively constructed.

The third means may perform counting associated with the period during which the answer signal is not detected, and output a warning when the count value becomes equal to or more than a predetermined value. Under circumstances when the reception of the answer signal in the second means can be delayed, and when the loss of the answer signal can occur due to the noise caused while the vehicle is running, for example, the frequent output of the warning can be prevented by providing a certain dead zone.

A vehicle that employs such an electronic key system is a vehicle that may include a control unit which transmits a request signal to a portable transmission/reception device which transmits an answer signal. The vehicle may comprise sensing means for sensing a traveling state of the vehicle and supplying the state to the control unit. The control unit may comprise: first means for outputting the request signal to the portable transmission/reception device at transmission intervals corresponding to the traveling state supplied from the sensing means; second means for detecting the answer signal caused by the request signal from the portable transmission/reception device; and third means for outputting a warning at a point after the detection of the answer signal in the second means has been interrupted, pauses, or stops.

If the occupant drops the portable transmission/reception device while the vehicle is running, the answer signal is no longer detected by the second means, a warning is outputted via the third means in this case, and the occupant becomes aware that the portable transmission/reception device has been dropped. Since the first means outputs the request signal at transmission intervals corresponding to the traveling state of the vehicle, an appropriate warning corresponding to the traveling state is outputted, and it is possible to further reduce the probability of the loss of the electronic key resulting from the occupant's having dropped the electronic key and to reduce the labor required to search for the key. Excessive transmission of the answer signal, and excessive power consumption from the battery can therefore be avoided.

Since the electronic key no longer excessively transmits the answer signal, and since the power consumption of the battery is suppressed, the intervals between battery replacements are extended.

DETAILED DESCRIPTION OF THE PREFERRED EMBODIMENTS

An electronic key system for a motorcycle (hereinafter referred to merely as the electronic key system according to this embodiment) is described herein below with reference to FIGS. 1 through 10.

Figure 1:
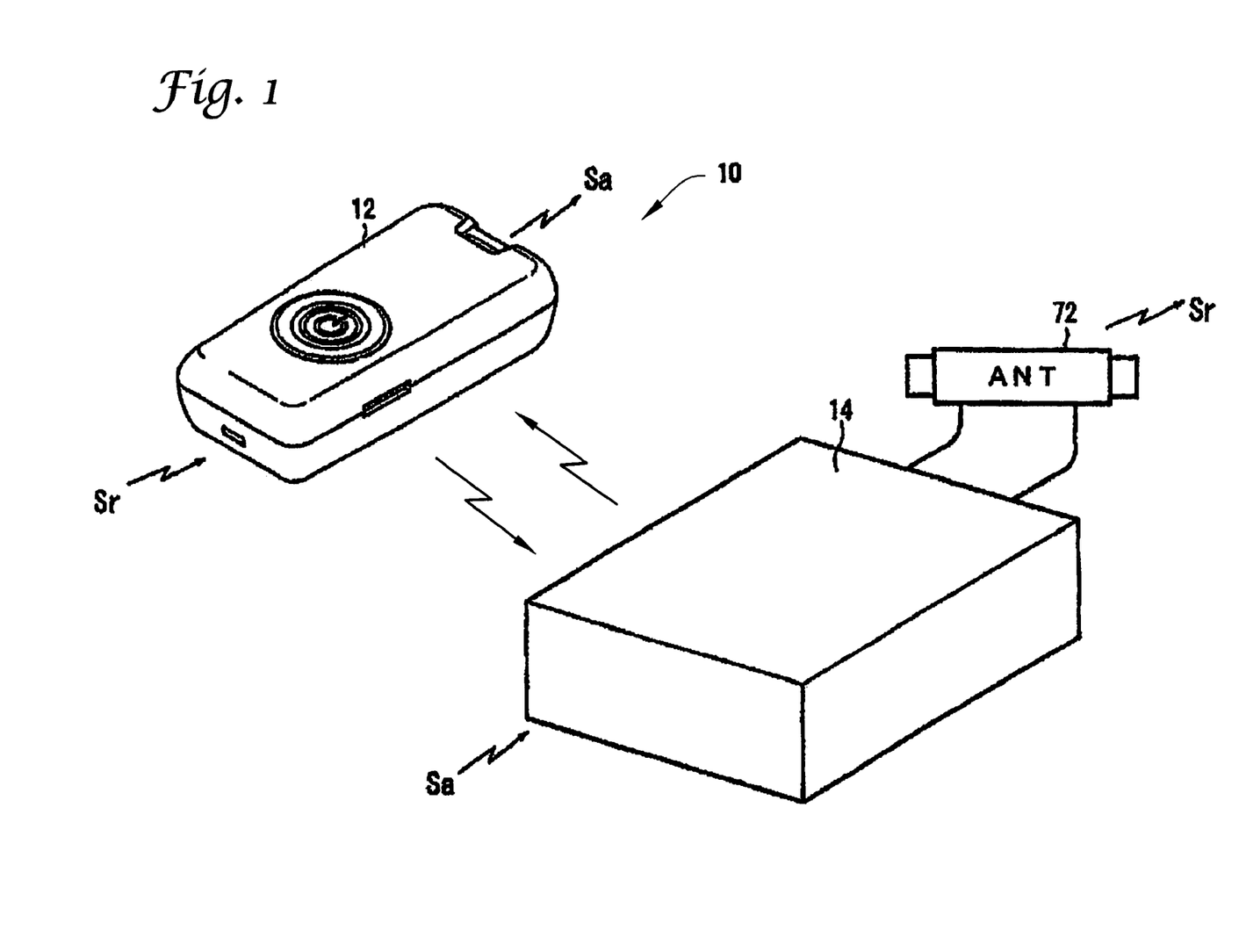
FIG. 1 is a configuration diagram showing an electronic key system according to an embodiment.

As shown in FIG. 1, an electronic key system 10 according to this embodiment includes a portable transmission/reception device 12 which an occupant carries, and a control unit 14 mounted on a vehicle. The portable transmission/reception device 12, may, for example, have a key shape as the external shape and in which an IC chip is embedded, or may, for example, have a card shape as the external shape, and in which an IC chip is embedded. The portable transmission/reception device 12 preferably employs the card shape when the portable transmission/reception device 12 is used in a keyless system. The description presented herein below with reference to the Figures assumes the portable transmission/reception device 12 has a card shape. Since the portable transmission/reception device 12 is generally called an electronic key, the portable transmission/reception device will be referred to as the electronic key 12 in the following description.

Figure 2:
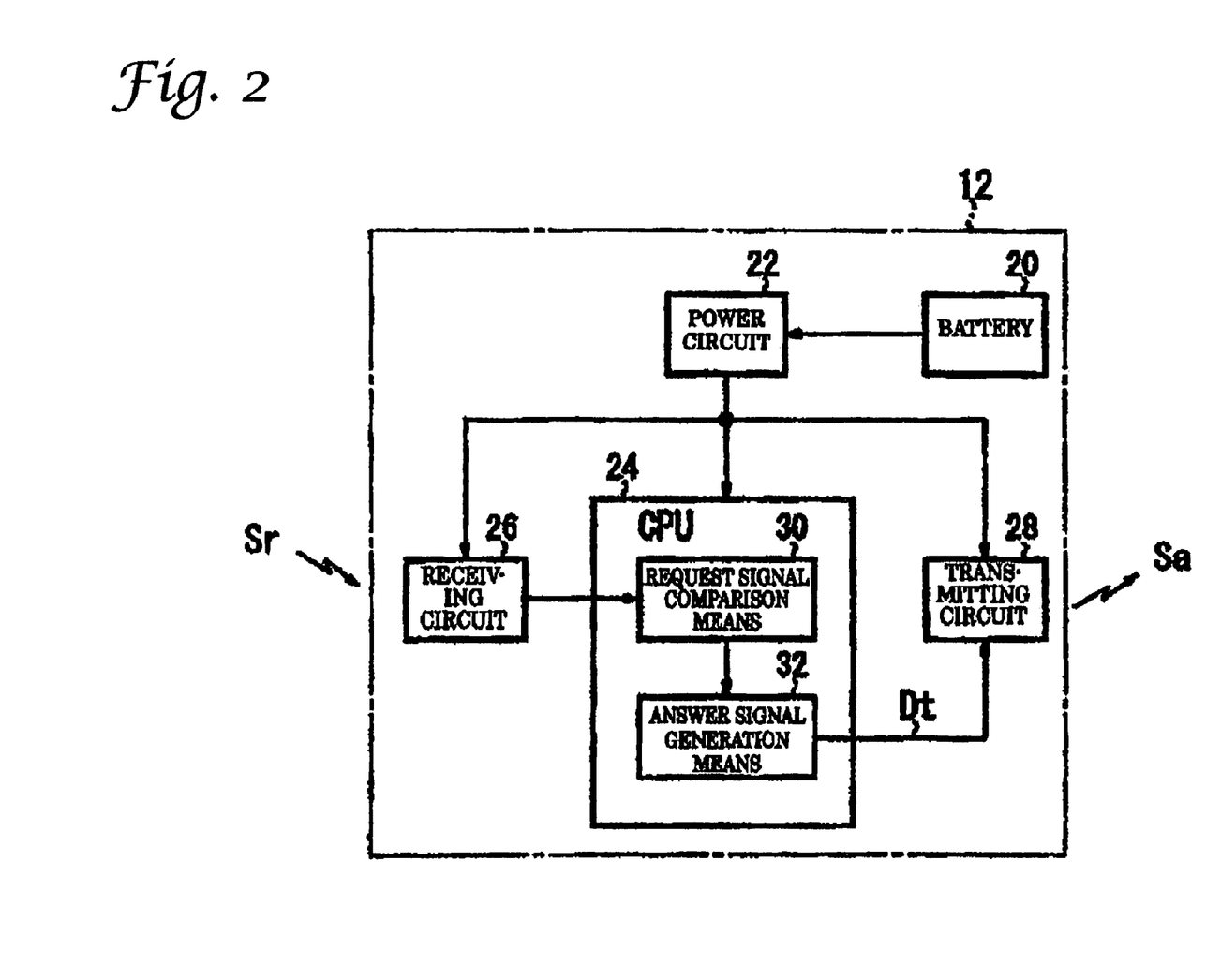
FIG. 2 is a block diagram showing a construction of an electronic key.

As shown in FIG. 2, the electronic key 12 therein includes a battery 20, a power circuit 22, a CPU (Central Processing Unit) 24, a receiving circuit 26 and a transmitting circuit 28.

The power circuit 22 is the circuit supplying power from the battery 20 to the receiving circuit 26, the transmitting circuit 28 and the CPU 24. The receiving circuit 26 has a receiving antenna which is not shown, and receives, for example, a request signal Sr transmitted from the control unit 14 to the receiving antenna, extracts the signal from a carrier wave, and demodulates the signal. The resultant demodulated signal is supplied to the CPU 24. The frequency of the carrier wave of the request signal Sr is from 100 kHz to 300 kHz, although the present invention is not so limited.

The CPU 24 executes at least two computer programs (request signal comparison means 30 and answer signal generation means 32). The request signal comparison means 30 checks whether the signal supplied from the receiving circuit 26 is the request signal Sr. If the received signal is the request signal Sr, the request signal comparison means 30 passes control to the answer signal generation means 32. The answer signal generation means 32 reads out ID data stored in a ROM (Read Only Memory) in accordance with the request from the request signal comparison means 30, adds, to this ID data, an attribute representing an answer, and outputs the ID data as transmission data Dt to the transmitting circuit 28. The transmitting circuit 28 has a transmitting antenna which is not shown, modulates a carrier wave on the basis of the transmission data Dt supplied from the CPU 24, and transmits the data as an answer signal Sa via the transmitting antenna. The frequency of the carrier wave of this answer signal Sa is most preferably from 200 MHz to 500 MHz, but is not so limited.

Figure 3:
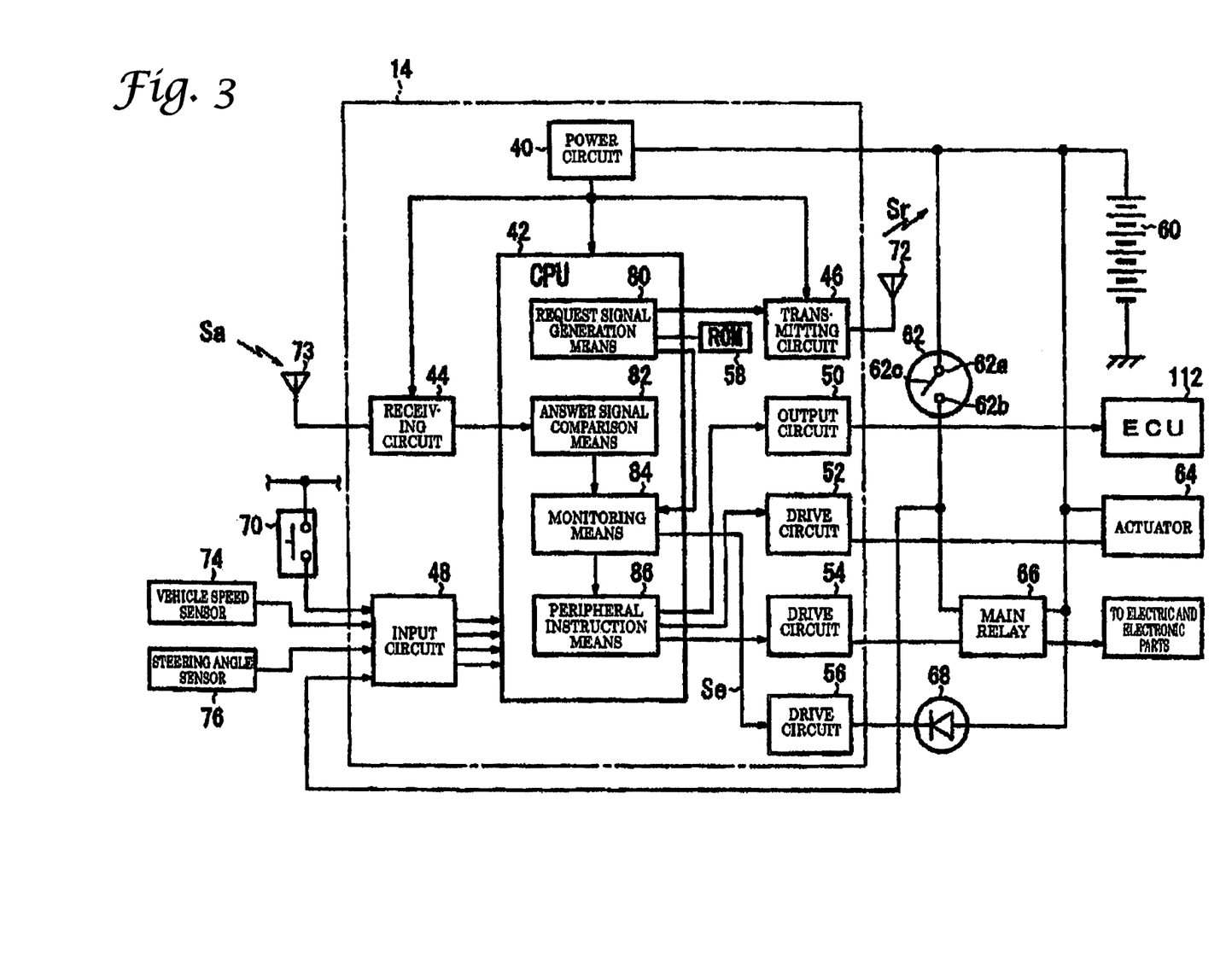
FIG. 3 is a block diagram showing a construction of a control unit.

As shown in FIG. 3, the control unit 14 comprises a system LSI, for example, and includes a power circuit 40, a CPU 42, a receiving circuit 44, a transmitting circuit 46, an input circuit 48, an output circuit 50, a first drive circuit 52 (for driving an actuator), a second drive circuit 54 (for driving a main relay), a third drive circuit 56 (for driving an LED), and a ROM 58. Associated with the control unit 14, there are installed at least a battery 60, a main switch 62, a handle actuator 64, a main relay 66, a warning lamp 68 such as an LED (Light Emitting Diode), an activation switch 70, a transmitting antenna 72, a receiving antenna 73, a vehicle speed sensor (sensing means) 74, and a steering angle sensor 76.

The vehicle speed sensor 74 is provided on an output stage of a transmission, senses the vehicle speed (the traveling state) V of a vehicle 100 (see FIG. 8A), and supplies the speed to the control unit 14. The steering angle sensor 76 is provided on a head tube portion which is a rotation support shaft of a handlebar 110, senses the steering angle θ of the handlebar 110, and supplies the angle to the control unit 14.

The main switch 62 has two fixed contacts 62a and 62b, and one movable contact 62c; one fixed contact 62a being connected to the battery 60, and the other fixed contact 62b being connected to the input circuit 48 and the main relay 66.

Fixed contact 62b of the main switch 62, as well as the activation switch 70, the vehicle speed sensor 74 and the steering sensor 76 are connected to the input circuit 48. The description below primarily describes the case where the processing operation is performed in accordance with the operation of the main switch 62.

The on/off state of the activation switch 70 and the on/off state of the main switch 62 are supplied to the CPU 42 via this input circuit 48.

The power circuit 40 in the control unit 14 supplies power from the battery 60 to the CPU 42, the receiving circuit 44, the transmitting circuit 46 and the like.

The receiving circuit 44 is connected to the receiving antenna 73, and receives, for example, the answer signal Sa transmitted from the electronic key 12 to the receiving antenna 73, extracts the signal from the carrier wave, and demodulates the signal. The demodulated signal is supplied to the CPU 42.

The CPU 42 executes at least four programs (request signal generation means 80, answer signal comparison means 82, monitoring means 84, and peripheral instruction means 86).

Figure 4:
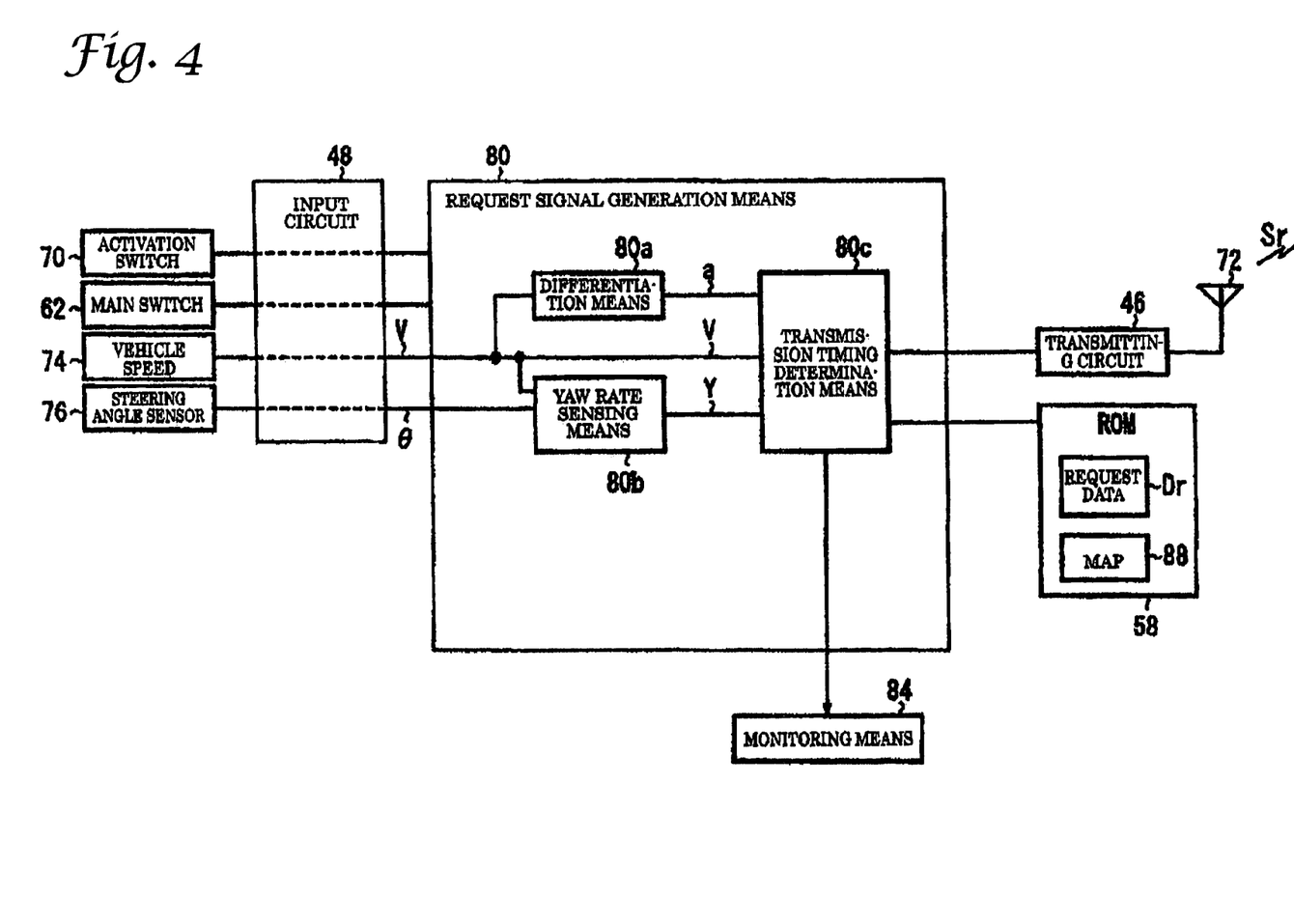
FIG. 4 is a block diagram showing a construction of request signal generation means.

As shown in FIG. 4, the request signal generation means 80 includes differentiation means (sensing means) 80a, yaw rate sensing means 80b, and transmission timing determination means 80c. The main switch 62, the activation switch 70, the vehicle speed sensor 74, and the steering angle sensor 76 are connected to the request signal generation means 80, to which a turning-on operation signal, the vehicle speed V, and the steering angle θ are supplied.

The differentiation means 80a derives the acceleration/deceleration (the traveling state) 'a' of the vehicle 100 by differentiating the sensed vehicle speed V. and supplies the acceleration/deceleration 'a'0 to the transmission timing determination means 80c. The yaw rate sensing means 80b determines the yaw rate (the traveling state) Y on the basis of the vehicle speed V and the steering angle θ, and supplies the yaw rate Y to the transmission timing determination means 80c. Specifically, the turning radius R is determined from the relation between the vehicle speed V and the steering angle θ, and the yaw rate Y is determined from the relation $Y=V^2/R$. The yaw rate Y is the turning acceleration in the lateral direction, which becomes larger as the turn becomes steep and the vehicle speed V becomes high, and which is small when the turn is gentle or when the vehicle speed V is low.

With regard to the sensing of the acceleration/deceleration 'a' and the yaw rate Y, a prescribed acceleration sensor and yaw rate sensor may be provided to perform the sensing, or alternatively, these may be obtained by the use of an appropriate map, other theoretical formulas, other experimental formulas or the like.

The transmission timing determination means 80c reads out request data Dr (the original data of the request signal Sr) from the ROM 58 in accordance with the turning-on operation of the activation switch 70 and the main switch 62, and outputs the data to the transmitting circuit 46.

After the engine is started, the transmission timing determination means 80c searches a map 88 stored in the ROM 58 on the basis of the vehicle speed V, the acceleration/deceleration 'a' and the yaw rate Y, and thereby determines the transmission interval T of the request data Dr. The request data Dr transmission interval T which has been set, is modulated in the transmitting circuit 46, and is transmitted as the request signal Sr via the transmitting antenna 72. At the same time, the trigger signal indicating the transmission timing of each transmission is transmitted to the monitoring means 84.

Figure 5:
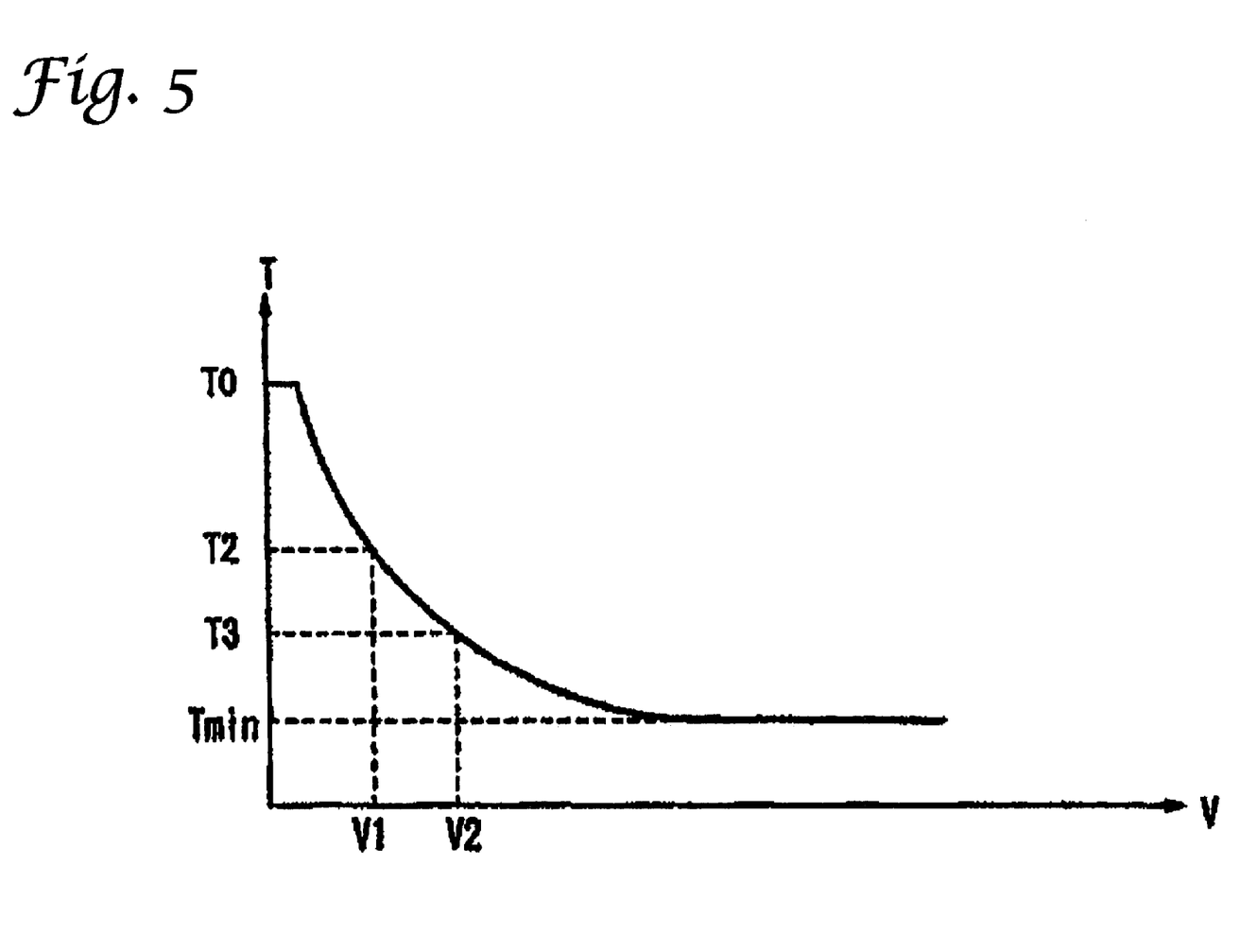
FIG. 5 is a map representing a relation between the speed and the transmission interval.

Here, the map 88 is three dimensional data for determining the transmission interval T using the vehicle speed V, the acceleration/deceleration 'a' and the yaw rate Y as search parameters. When the vehicle speed V is taken as a variable in association with the acceleration/deceleration 'a' and the yaw rate Y assumed to be zero, as shown in FIG. 5, a map 88 setting is employed that causes the transmission interval T to decrease as the vehicle speed V increases. Specifically, during a stop (when V=0), T=T0; the interval T decreases inversely with the increase of the vehicle speed V; and the interval T becomes a certain minimum setting value Tmin when the vehicle speed V is equal to or more than a predetermined value.

Figure 6:
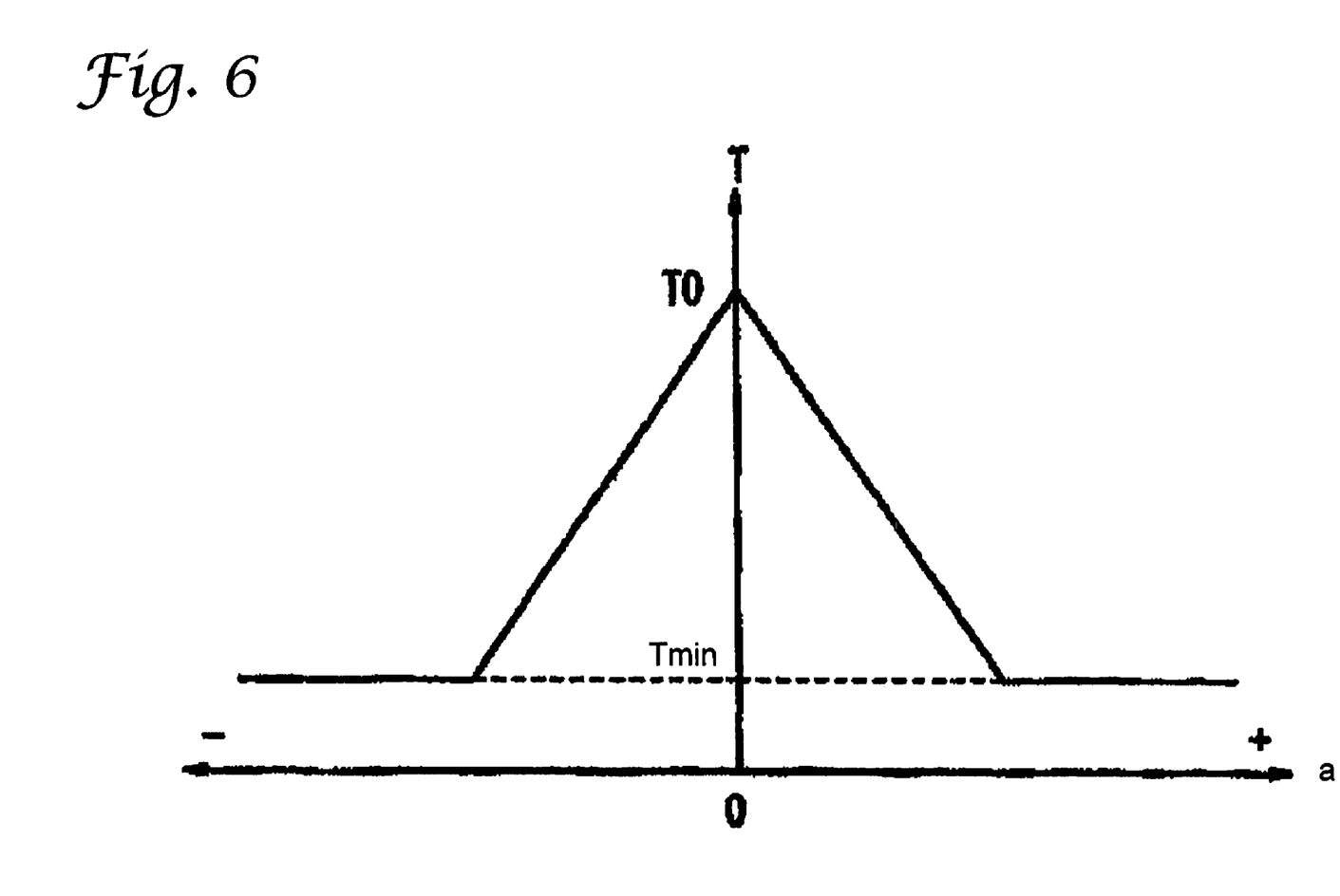
FIG. 6 is a map representing a relation between the acceleration/deceleration and the transmission interval.

When the acceleration/deceleration 'a' is taken as a variable with the vehicle speed V and the yaw rate Y assumed to be zero, as shown in FIG. 6, a setting is employed that causes the transmission interval T to decrease as the absolute value of the acceleration/deceleration 'a' increases. In other words, the more rapid the acceleration or deceleration is, the shorter the transmission interval T is. Specifically, during a constant-speed cruise (when a=0), T=T0; the interval T decreases inversely with the increase of the absolute value of the acceleration/deceleration 'a'; and the interval T is limited at a certain minimum setting value Tmin when the absolute value of the acceleration/deceleration 'a' is equal to or more than a predetermined value.

Figure 7:
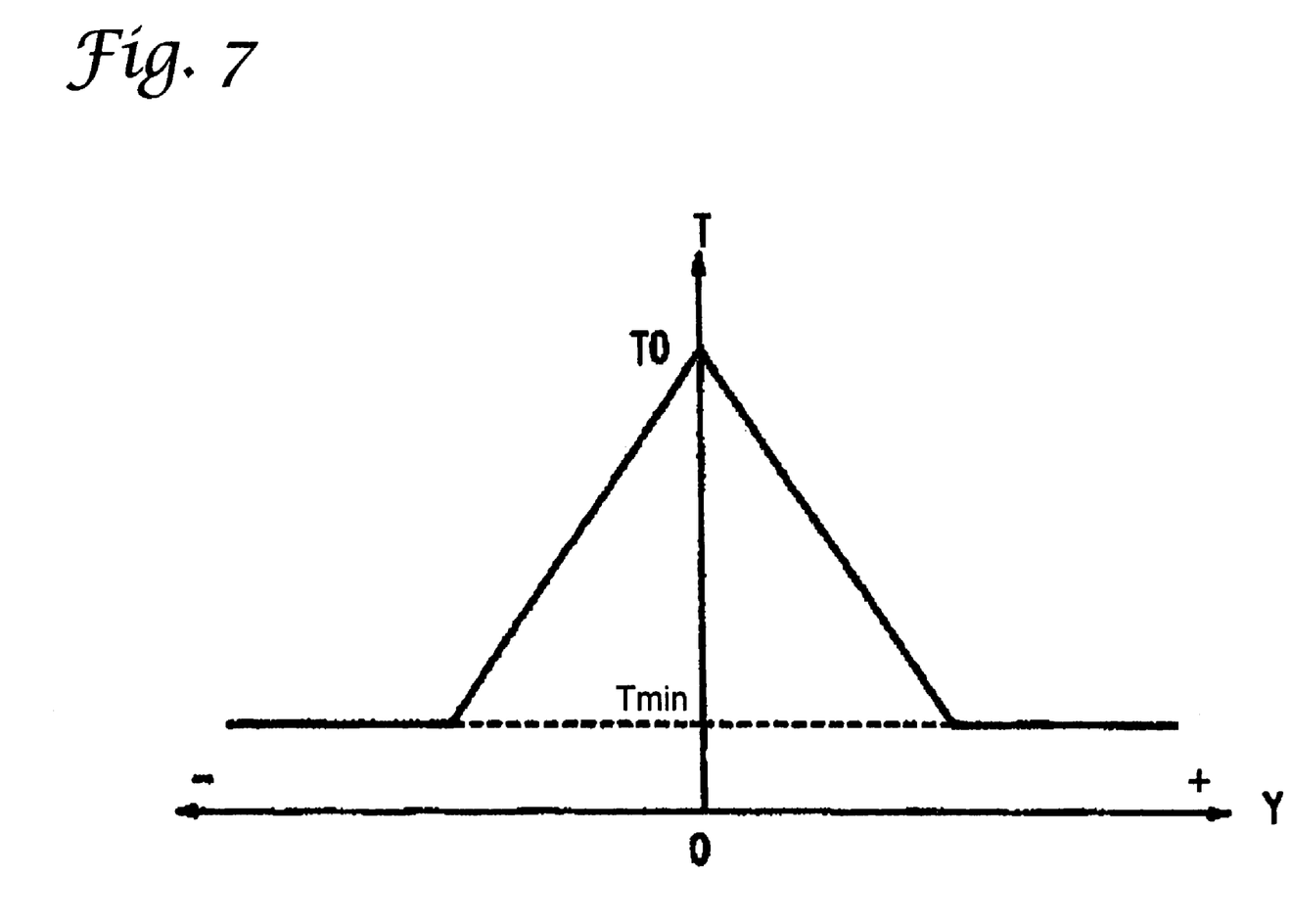
FIG. 7 is a map representing a relation between the yaw rate and the transmission interval.

When the yaw rate Y is taken as a variable with the vehicle speed V and the acceleration/deceleration 'a' respectively assumed to be zero, as shown in FIG. 7, a setting is employed that causes the transmission interval T to decrease as the absolute value of the yaw rate Y increases. In other words, in the case of either a left turn or a right turn, the transmission interval T decreases as the turn becomes faster and steeper. Specifically, during straight-ahead driving (when Y=0), T=T0; the interval T decreases inversely with the increase of the absolute value of the yaw rate Y; and the interval T is limited at a certain minimum setting value Tmin when the absolute value of the yaw rate Y is equal to or more than a predetermined value.

The map 88 comprises data into which the characteristics shown in FIGS. 5 to 7 are combined; and a map setting is employed that causes the transmission interval T to decrease as the vehicle speed V, the acceleration/deceleration 'a', or the yaw rate Y increases, wherein the lower limit is Tmin. By searching the map 88 like this, it is possible to quickly and easily set the transmission interval T -corresponding to the traveling state. The means for determining the transmission interval T is not limited to the method in which the map 88 is searched; and the interval T may also be determined by the use of a certain relational expression or the like.

Figure 8A:
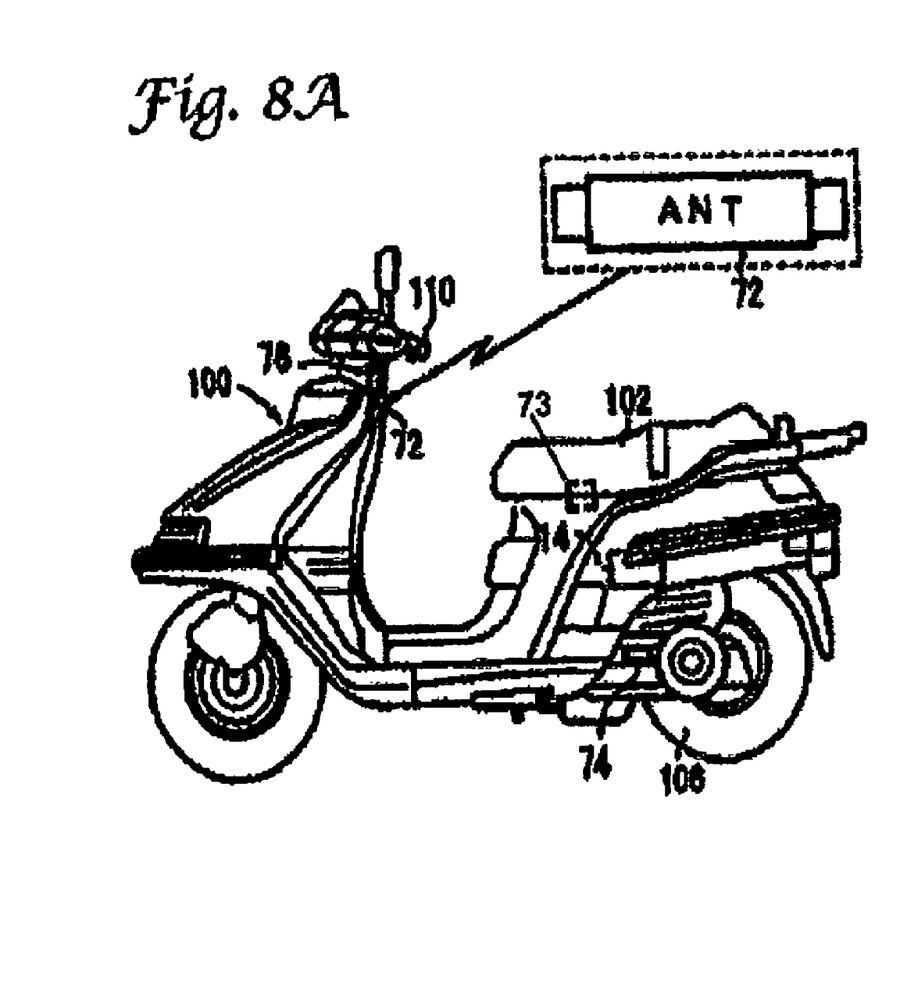
FIG. 8A is a side view showing an example of installation locations of transmitting antennas on a vehicle.
Figure 8B:
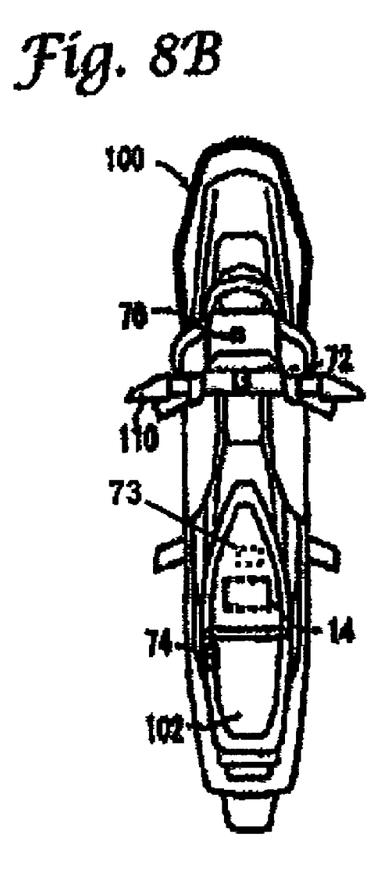
FIG. 8B is a plan view showing the example of installation location of transmitting antennas on the vehicle shown in FIG. 8A.

As shown in FIGS. 8A and 8B, the vehicle 100 is a motor scooter, and the transmitting antenna 72 is disposed under the handlebar 110. The receiving antenna 73 is disposed in a front and slightly lower area of a seat 102. The control unit 14 is provided in a substantially middle area between the seat 102 and a rear wheel 106. With such an arrangement, the control unit 14 can reliably communicate with the electronic key 12 which an occupant carries.

Returning to FIG. 3, the answer signal comparison means 82 checks whether the signal supplied from the receiving circuit 44 is the answer signal Sa. If the received signal is the answer signal Sa, the answer signal comparison means 82 checks whether the ID data included in the answer signal Sa matches the ID data registered in a memory which is not shown.

The monitoring means 84 monitors whether the answer signal Sa comes in (whether the coincidence between the IDs in the answer signal comparison means 82 is detected). The monitoring means 84 enters the input waiting state for the answer signal Sa at the point of time when the trigger signal is supplied from the request signal generation means 80. If no answer signal Sa comes in during a predetermined very short period (if the coincidence between the IDs is not detected in the answer signal comparison means 82), the count value is updated by +1. When the count value becomes equal to or larger than a predetermined value, the monitoring means 84 outputs a warning signal Se to the third drive circuit 56.

If the answer signal Sa comes in within a predetermined period since the request data Dr is outputted in accordance with the turning-on operation of the activation switch 70, the monitoring means 84 activates the peripheral instruction means 86. The peripheral instruction means 86 outputs an unlocking signal to the first drive circuit 52 in accordance with the request (to unlock) from the monitoring means 84, outputs a permission signal to the output circuit 50, and outputs an on signal to the second drive circuit 54.

The first drive circuit 52 drives the handle actuator 64 in accordance with the input of the unlocking signal from the CPU 42, and unlocks the handlebar 110 (see FIGS. 8A and 8B).

The output circuit 50 outputs an ignition/injection permission signal to an ECU 112 (Electronic Control Unit) in accordance with the input of the permission signal from the CPU 42. The ECU 112 determines the fuel injection amount and the injection timing of the engine from the information sent from respective sensors in accordance with the input of the ignition/injection permission signal.

The second drive circuit 54 enters an on state in accordance with the input of the on signal from the CPU 42. Thereafter, when the turning-on operation of the main switch 62 is performed, and the main relay 66 is thereby turned on, the engine starts, and the vehicle becomes ready to run.

The third drive circuit 56 drives the warning lamp 68 in accordance with the input of the warning signal Se from the CPU 42, and the warning lamp 68 flashes.

When the turning-off operation of the main switch 62 is performed, the main relay 66 is turned off, and the engine stops at the same time. Thereafter, when a locking operation, such as the locking operation of the handlebar 110, is performed, the comparison operation of the answer signal Sa in the control unit 14 is stopped, and the output of the ignition/injection permission signal from the output circuit 50 is also stopped. In addition, the second drive circuit 54 is turned off.

Figure 9:
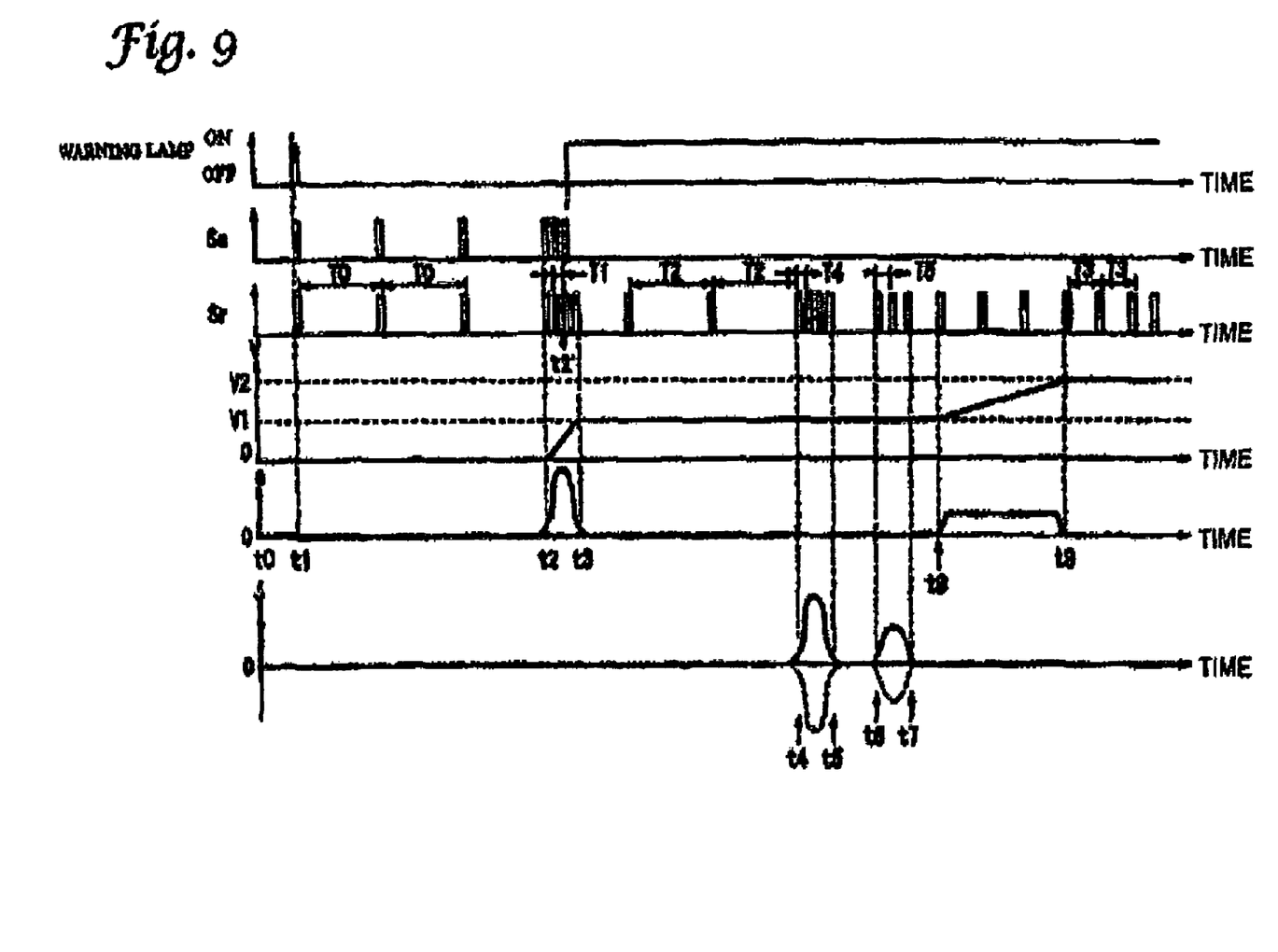
FIG. 9 is a timing chart showing the transition of a warning lamp, an answer signal, a request signal, a vehicle speed, an acceleration/deceleration, and a yaw rate.

A description of an exemplary process of the electronic key system 10 according to this embodiment is presented herein below with reference to a timing chart of FIG. 9. The request signal Sr is a signal with a pulse train based on the request data Dr; and the answer signal Sa is a signal with a pulse train based on the data including the ID data. In FIG. 9, for ease of explanation, each of these signals is expressed by one pulse signal; and the explanation of the counting function used when no answer signal Sa comes in in the monitoring means 84 is omitted. The counting function will later be explained herein below with reference to FIG. 10. In FIG. 9, it is assumed that a certain time elapses in the order of the suffix numbers in such a manner as follows: time t0, t1, t2, t3 . . . .

During the stop time from t0 to t2, since the vehicle speed V, the acceleration/deceleration 'a' and the yaw rate Y are zero, the transmission timing determination means 80c refers to the map 88, and thereby sets the transmission interval T of the request signal Sr to T ← T0 and performs transmission. The electronic key 12 sends back the answer signal Sa every time the request signal Sr is received. The control unit 14 having received the answer signal Sa performs confirmation of receipt via the monitoring means 84. The confirmation of receipt is carried out within a predetermined very short period since the trigger signal is supplied from the request signal generation means 80, and the control unit 14 judges the electronic key 12 to be present in a transmissible area, and keeps the warning lamp 68 in the off state. The transmission interval T0 in this case is a sufficiently long interval; and the power consumption of the battery 20 in the electronic key 12 is thereby suppressed.

The confirmation of receipt of the answer signal Sa corresponding to the request signal Sr is normally carried out just after the activation of the electronic key system 10, or at the time when the vehicle speed V is zero, such as the predetermined time t1, in order to indicate that the electronic key system 10 functions normally, and the warning lamp 68 may be lit up for a short time. Thus, it is made possible for a driver to confirm that the system including the warning lamp 68 functions normally; and the reliability of the electronic key system 10 increases.

Next, if the vehicle 100 is allowed to start moving, and is accelerated to the speed V1 through a rapid acceleration during the time from t2 to t3, the acceleration/deceleration becomes a positive large value. Accordingly, the transmission timing determination means 80c sets the transmission interval T of the request signal Sr to a considerably short transmission interval T1 corresponding to the change of the acceleration/deceleration 'a' particularly as a reference parameter among the three reference parameters in the map 88, and performs transmission. During the rapid acceleration or deceleration, since the acceleration is also applied to the electronic key 12, there is an increased possibility that the electronic key 12 is dropped. However, by transmitting the request signal Sr and performing the confirmation of receipt of the answer signal Sa at the considerably short transmission intervals T1, it is possible to more quickly output a warning. If the electronic key 12 is dropped at the time t2' during this period and leaves the transmissible area, the answer signal Sa is no longer received, and it is possible to warn the occupant by lighting up the warning lamp 68 under the control of the third drive circuit 56.

In this case, since it is possible to output a warning earlier by the time up to T0-T1 in comparison with the timing in the state where the vehicle 100 is at a stop, it is possible for the occupant to immediately return to the point where the electronic key 12 has been dropped; and the time and labor required to search for the key is therefore reduced.

Although, during this period, the electronic key 12 transmits the answer signal Sa quite frequently, and since the period during which the vehicle 100 is rapidly accelerated or decelerated (and the period of cornering, the time from t4 to t5 and from t6 to t7 described later) is short while the vehicle 100 is running, the extreme power consumption of the battery 20 is prevented.

Since the transmission interval T is set short corresponding to the increase of the acceleration/deceleration 'a', the transmission interval T varies little, for example, when the vehicle is moderately accelerated during the subsequent time from t8 to t9, and when the acceleration/deceleration 'a' is thus small. This is because, during moderate acceleration, the possibility that the electronic key 12 is dropped is relatively small, and it is unnecessary to set the transmission interval T unnecessarily short. In addition, although the diagramatic representation is omitted, the transmission interval T is also set short during the rapid deceleration, and it is then also possible to output an early warning to the occupant when the electronic key 12 is dropped.

Next, if the vehicle 100 is cruising at a constant speed, keeping the speed V1, during the time from t3 to t4, since the acceleration/deceleration 'a' and the yaw rate Y are zero, the transmission timing determination means 80c refers to the data in the map 88, the data representing the relation between the vehicle speed V and the transmission interval T shown in FIG. 5. Then, the transmission timing determination means 80c reads out a suitable transmission interval T2 corresponding to the speed V1, and sends the request signal Sr at the transmission intervals T2. In this way, even if the electronic key 12 has been dropped during a constant-speed cruise, it is possible to output a warning at an adequate timing; and it is possible to warn the occupant at a relatively early timing.

Since the transmission interval T is set short, corresponding to the increase of the vehicle speed V, the transmission interval T is set to a further short transmission interval T3 when the vehicle cruises at a high speed V2, for example, after the subsequent time t9. Accordingly, in the case where the electronic key 12 has been dropped, it is possible to output a warning to the occupant at an earlier timing than that achievable using prior art techniques.

In addition, if the travel distance L from the point where the electronic key 12 has been dropped to the point where the warning is outputted is specified, the occupant does not have to return more than the distance L when the warning lamp 68 lights up, which is preferable because the area to search the key is limited to the travel distance L. If the scenario involves only straight-ahead driving at a constant speed, the occupant need only search the point distant by the distance L back from the point where the warning lamp 68 lit up on the basis of the indication of the tripmeter or the like, which further reduces the labor required to search for the key. In this case, L=T2×V1=T3×V2, and the graph as shown in FIG. 5 becomes an inversely proportional one.

Next, if the vehicle 100 steeply turns to the right, keeping the speed V1, during the time from t4 to t5, the yaw rate Y becomes a positive large value. Accordingly, the transmission timing determination means 80c sets the transmission interval T of the request signal Sr to a considerably short transmission interval T4 corresponding to the change of the yaw rate Y, particularly as a reference parameter among the three reference parameters in the map 88, and performs transmission. During the steep turn, since the lateral acceleration is also applied to the electronic key 12, there is a possibility that the electronic key 12 is dropped. However, by transmitting the request signal Sr and performing the confirmation of receipt of the answer signal Sa at the considerably short transmission intervals T4, it is possible to more quickly output a warning.

Since the transmission interval T is set short corresponding to the increase of the yaw rate Y, the request signal Sr is transmitted at the transmission intervals T5 longer than the transmission intervals T4 corresponding to the yaw rate Y when the vehicle is gently turning during the time from t6 to t7, for example, and when the yaw rate Y is thus small. Since the possibility is relatively small that the electronic key 12 is dropped during the gentle turn, it is unnecessary to set the transmission interval T unnecessarily short. When the vehicle turns to the left, the yaw rate Y becomes a negative value as shown by the broken line in FIG. 9, but the transmission interval T is set in accordance with the absolute value of the yaw rate Y, so that the same effect as that obtained in the case of the right turn can be obtained.

Next, a process carried out when the electronic key 12 is not consistently detected while the vehicle 100 is running, is described with reference to FIG. 10.

Figure 10:
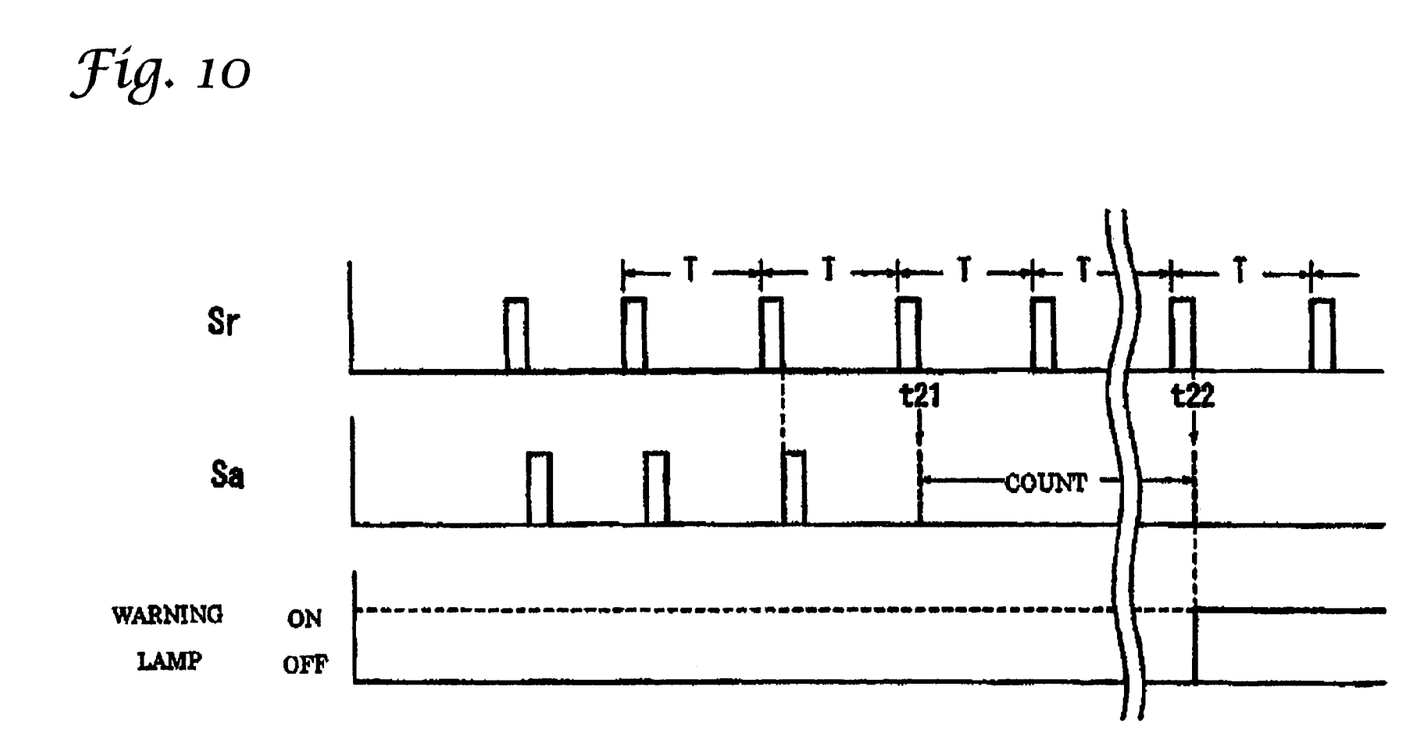
FIG. 10 is a timing chart showing a process of the counting function in monitoring means carried out when the electronic key is dropped.

As described above, if the electronic key 12, for example has been dropped while the vehicle 100 is running, the reception of the answer signal Sa in the control unit 14 is stopped (see the time t21 in FIG. 10). If no answer signal Sa is received within a predetermined period, the request data Dr is outputted, and the count value is updated by +1. In the situation in which the request signal Sr is outputted sequentially, the warning signal Se is outputted from the monitoring means 84 to the third drive circuit 56 at the time point t22 when the count value becomes equal to or more than a predetermined value, so that the warning lamp 68 lights up as shown in FIG. 10.

The lighting up of the warning lamp 68 makes the occupant aware that the electronic key 12 has been dropped, so that the loss of the electronic key 12 can be prevented.

As described above, in the case where the occupant has dropped the electronic key 12 while the vehicle 100 is running, the answer signal Sa is no longer detected in the receiving circuit 44 even if the request signal Sr is outputted from the control unit 14 at the transmission intervals T, so that the warning is outputted via the monitoring means 84, and the occupant therefore becomes aware that the electronic key 12 has been dropped. Under circumstances such that the reception of the answer signal Sa can be delayed, or such that the loss of the answer signal Sa can occur due to the noise caused while the vehicle is running, for example, the frequent output of the warning can be prevented by providing a certain dead zone.

The electronic key system 10 utilizes radio waves for the transmission/reception of the request signal Sr and the answer signal Sa. Radio waves have a high penetrability characteristic, with which it is possible to transmit/receive signals, without the undue influence of obstacles such as clothes. Moreover, even in the case of a considerably complex signal, the transmission/reception thereof is easy. In addition, the transmitting circuits 28 and 46, and the receiving circuits 26 and 44 for the transmission/reception can be constructed inexpensively.

Although a dedicated warning lamp 68 is lit up, a dedicated buzzer may be used to also provide an audio output.

Alternatively, an indicator lamp in the existing meter may be flashed randomly; the warning may be outputted as a predetermined pattern of sound (an audio pattern) via a horn; and winkers may be flashed in a flashing pattern different from the normal one.

It should be noted that, since horns and winkers are safety related parts, these should not be operated for the above-described warning purpose when the engine is in operation, and should instead be operated as the safety related parts as they are.

The vehicle 100 to which the electronic key system 10 is applied is not limited to a motorcycle, and may be a general four-wheeled vehicle, an all-terrain vehicle (commonly called a buggy), a personal watercraft, or the like.

It should be noted that the electronic key system for a vehicle and the vehicle according to the present invention are not limited to the above embodiments, and various configurations may be employed without departing from the spirit of the present invention.

What is claimed is:

1. An electronic key system for a vehicle, comprising:
   a control unit mounted on the vehicle, wherein the vehicle is a motorcycle; and
   a portable transmission/reception device for transmitting an answer signal in accordance with reception of a request signal from the control unit, wherein the control unit comprises:
   first means for outputting the request signal to the portable transmission/reception device at transmission intervals corresponding to a traveling state of the vehicle, wherein the traveling state includes a vehicle speed, and acceleration/deceleration,
   the first means shortens the transmission interval of the request signal corresponding to an increase of the vehicle speed,
   the first means shorten the transmission interval of the request signal corresponding to an increase of the acceleration/deceleration, and
   wherein the vehicle speed and the transmission interval of the request signal are set inversely proportional to each other;
   second means for detecting the answer signal caused by the request signal from the portable transmission/reception device; and
   third means for outputting a warning at a point after the detection of the answer signal in the second means stops.

2. The electronic key system for a vehicle according to claim 1, wherein the traveling state further includes a yaw rate, and the first means shortens the transmission interval of the request signal corresponding to an increase of the yaw rate.

3. The electronic key system for a vehicle according to claim 1, wherein the control unit has a map representing the transmission interval of the request signal and the traveling state, and
   the first means searches the map on the basis of the traveling state, and sets the transmission interval of the request signal.

4. The electronic key system for a vehicle according to claim 1, wherein the control unit and the portable transmission/reception device perform the transmission/reception of the answer signal and the request signal via a radio wave.

5. The electronic key system for a vehicle according to claim 1, wherein the third means performs counting associated with a period during which the answer signal is not detected, and outputs a warning when the count value becomes equal to or more than a predetermined value.

6. A vehicle, comprising:
   a control unit which transmits a request signal to cause a portable transmission/reception device to transmit an answer signal; and
   sensing means for sensing a traveling state of the vehicle, wherein the traveling state includes a vehicle speed, and an acceleration/deceleration, and
   supplying the traveling state to the control unit,
   wherein the control unit comprises:
   first means for outputting the request signal to the portable transmission/reception device at transmission intervals corresponding to the traveling state supplied from the sensing means,
   wherein the first means shortens the transmission interval of the request signal corresponding to an increase of the vehicle speed,
   wherein the first means shortens the transmission interval of the request signal corresponding to an increase of the acceleration/deceleration, and
   wherein the vehicle speed and the transmission interval of the request signal are set inversely proportional to each other;
   second means for detecting the answer signal caused by the request signal from the portable transmission/reception device; and
   third means for outputting a warning at a point after the detection of the answer signal in the second means stops.

* * * * *